(12) United States Patent
Kim (10) Patent No.: US 10,082,821 B1
(45) Date of Patent: Sep. 25, 2018

(54) IMPACT SEPARATION TYPE PEDAL

(71) Applicants: HYUNDAI MOTOR COMPANY, Seoul (KR); KIA MOTORS CORPORATION, Seoul (KR)

(72) Inventor: Eun-Sik Kim, Gwangmyeong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/856,311

(22) Filed: Dec. 28, 2017

(30) Foreign Application Priority Data

Jun. 28, 2017 (KR) .................. 10-2017-0081794

(51) Int. Cl.
| G05G 1/30 | (2008.04) |
| G05G 1/327 | (2008.04) |
| B60T 7/06 | (2006.01) |
| B60K 26/02 | (2006.01) |
| G05G 1/44 | (2008.04) |
| B60K 23/02 | (2006.01) |

(52) U.S. Cl.
CPC .............. *G05G 1/327* (2013.01); *B60K 23/02* (2013.01); *B60K 26/02* (2013.01); *B60T 7/065* (2013.01); *G05G 1/44* (2013.01); *B60Y 2400/402* (2013.01)

(58) Field of Classification Search
CPC .......... G05G 1/327; G05G 1/323; G05G 1/32; G05G 1/30; G05G 1/44; G05G 1/445; G05G 5/03; G05G 5/05; B60R 21/09; B60T 7/065; B60T 7/06; B60T 7/04
See application file for complete search history.

(56) References Cited

U.S. PATENT DOCUMENTS

| 9,032,836 B2 * | 5/2015 | Min .................. G05G 1/327 74/512 |
| 9,298,209 B2 * | 3/2016 | Kim .................. G05G 1/44 |
| 2002/0043125 A1 * | 4/2002 | Oono .................. B60T 7/065 74/512 |

(Continued)

FOREIGN PATENT DOCUMENTS

| DE | 19631868 A1 * | 2/1998 | ............. B60R 21/09 |
| DE | 102012010674 A1 * | 12/2013 | ............... G05G 1/30 |

(Continued)

OTHER PUBLICATIONS

Machine Translation of DE 19631868, obtained Jun. 22, 2018.*
Machine Translation of DE 10 2012 010 674, obtained Jun. 22, 2018.*

*Primary Examiner* — Richard W Ridley
*Assistant Examiner* — Brian J McGovern
(74) *Attorney, Agent, or Firm* — Lempia Summerfield Katz LLC (57) ABSTRACT

The present disclosure provides a pedal 1 that includes a left bracket and right bracket that are combined such that a portion coupled to a hinge of a pedal arm and another portion fixed to a vehicle body are fitted to each other in an X-shape. A cover bracket is welded to the left and right brackets and over the X-shaped portion. A fixing pin welded to the left and right brackets and at a cross-point of the X-shape. The pedal arm is separated due to deformation in an impact direction in an oblique collision as well as a front, offset, or small overlap collision of a vehicle. Thus, the pedal makes it possible to prevent a driver from being injured by the pedal.

16 Claims, 9 Drawing Sheets

(56) References Cited

U.S. PATENT DOCUMENTS

2002/0096383 A1* 7/2002 Hirata ................... B60R 21/09
　　　　　　　　　　　　　　　　　　　　　180/271
2015/0168986 A1* 6/2015 Kim ........................ G05G 1/30
　　　　　　　　　　　　　　　　　　　　　74/512

FOREIGN PATENT DOCUMENTS

| KR | 1020060002422 | 1/2006 |
| KR | 1020070016554 | 2/2007 |
| KR | 1020090102885 | 10/2009 |

* cited by examiner

BEFORE COLLISION     AFTER COLLISION

னாஇMPACT SEPARATION TYPE PEDAL

CROSS-REFERENCE TO RELATED APPLICATIONS

This application claims priority to and the benefit of Korean Patent Application No. 10-2017-0081794, filed on Jun. 28, 2017, which is incorporated herein by reference in its entirety.

BACKGROUND

Field of the Disclosure

The present disclosure relates to an impact separation type pedal and, more particularly, to an impact separation type pedal that satisfies an oblique test.

Description of Related Art

In general, a pedal anti-pushing structure is applied to the pedals in vehicles to prevent a driver from being injured by the pedals that are pushed toward the driver in a vehicle collision. In this disclosure, pedals mean a brake pedal, a clutch pedal, and an accelerator pedal.

For example, the pedal anti-pushing structure is rotated backward in a backward rotation type pedal when being pushed backward or prevents the pedals from being pushed in a pedal stopper type pedal when a vehicle is in an offset collision or a small overlap collision. In this disclosure, offset collision means a frontal collision offset from center on the front-left side of a vehicle and small overlap collision means a frontal collision severely offset on the front part of the driver's side of a vehicle.

As a result, pedals should satisfy regulations about backward pushing of pedals under the U.S. National Highway Traffic Safety Administration (NHTSA), the European New Car Assessment Program (Euro N-CAP), or the Korean New Car Assessment Program (KNCAP).

SUMMARY

However, the anti-pedal pushing structure of the backward rotation type or the pedal stopper type secure only safety in an offset collision or a small overlap collision, but do not secure safety in an oblique collision under NHTSA. This is because the oblique collision is a diagonal collision in which a collision barrier (or a moving wall) diagonally collides with a vehicle. In an oblique collision, a pedal is diagonally pushed back toward a driver.

For example, the backward rotation type pedal is equipped with a backward rotation lever. When the pedal diagonally collides, the backward rotation lever cannot be rotated, so it is difficult to rotate backward. Further, the pedal stopper type pedal has a stopper formed in a cantilever structure at a cowl crossbar. The stopper at the cowl crossbar does not have enough rigidity to resist a pedal pushed in an oblique collision of a vehicle. As a result, when the pedal stopper type is exposed to an oblique collision, the pedal is diagonally pushed. The pedal stopper has to have substantial strength, which necessarily increases the manufacturing cost and weight.

As described above, in a new oblique collision test, a pedal is both pushed backward and rotated. It is thus difficult to deal with this type of collision even with the most common pedal stopper. Thus, there is a need to develop a new technology that reduces a pushing amount of a pedal when the pedal is diagonally pushed in a collision.

Accordingly, the present disclosure is made in an effort to solve this problem. An object of the present disclosure is to provide an impact separation type pedal that is separated by deformation of a part in an impact direction only in a vehicle collision with the strength and rigidity of the pedal maintained. It is also an object of the present disclosure to provide such an impact separation type pedal that does not injure a driver when being pushed because it can be separated even under various collision conditions. Such collisions may include front/offset/small overlap collisions and may also include oblique collisions. It is also an object of the present disclosure to provide a vehicle equipped with such an impact separation type pedal.

A pedal of the present disclosure for achieving the objects includes a pair of brackets including a left bracket and a right bracket combined such that a portion is coupled to a hinge of a pedal arm and another portion is fixed to a vehicle body. The left bracket and the right bracket are fitted to each other in an X-shape. A cover bracket is fixed to the left bracket and the right bracket over the X-shaped portion. A fixing pin is fixed to the cover bracket to be fixed to the left bracket and the right bracket at the X-shaped portion.

Left and right sides of the cover bracket form the fixing while covering the widths of the left bracket and the right bracket. The fixing pin performs the fixing by perpendicularly connecting the cover bracket and a cross point of the left and right brackets. The fixing is spot welding.

The left bracket includes a left fixing body having a downward slit, a left separation body bending from the left cross body toward the hinge, and a left fixing body bending toward the vehicle body from the left cross body. The right bracket includes a right cross body having an upward slit, a right separation body bending toward the hinge from the right cross body, and a right fixing body bending toward the vehicle body from the right cross body. The lower lit and the upper slit form the X-shape by being fitted to each other. The left separation body and the right separation body form the hinge coupling. The left fixing body and the right fixing body form the vehicle body fixing.

The hinge coupling is made by left and right ball ends, which are fitted in a left projective groove of the left separation body and a right projective groove of the right separation body, respectively, of the hinge point of the hinge. The hinge pin is fitted in a hinge pipe fixed to the pedal arm with left and right hinge bushes fitted thereon, so that the left and right ball ends are exposed to the left and the right. The ball ends, the left projective groove, and the right projective groove are formed in a semispherical shape. The vehicle body fixing is secured to the vehicle body by bolts or screws.

The cover bracket forms the vehicle body fixing portion with a mounting body formed by bending the cover bracket from the left bracket and a cover body fixed to the right bracket and has an extension body bending from the cover body opposite to the mounting body. The mounting body is fixed to the vehicle body by bolts or screws and a kick-down switch is coupled to the extension body.

The pedal arm secures a pedal member rigidity-securing distance from a distance between the X-shaped cross point and the hinge.

Further, a vehicle of the present disclosure for achieving the objects includes a pedal that has a cover bracket forming left and right welding surfaces welded to a pair of brackets including a left bracket and a right bracket coupled to a hinge body of a pedal arm in an X-shape. The pedal also has a fixing pin having an upper welding surface welded to the left bracket and the right bracket at a cross-point of the X-shape and having a lower welding surface welded to the cover bracket. The vehicle also has a dash panel having a fixing portion for fixing the left bracket, the right bracket, and the cover bracket.

The fixing portion is disposed on a cowl panel connected to the dash panel. The pedal arm is connected with a booster rod of a booster.

According to the impact separation type pedal for a vehicle of the present disclosure, the pedal is separated by a larger deformation of the dash panel than of a cowl fixing portion in a collision. The pedal can thus be separated even under various collision conditions particularly such as front/offset or small overlap collisions and oblique collisions. The disclosed pedal does not injure a driver and also provides the following effects.

First, reduction of the manufacturing cost is achieved because the pedal has a simple structure as compared with existing pedal stopper technology or backward rotation technology. Second, improvement of collision performance is achieved because the pedal hinge for separating the pedal is definitely separated even in any collision conditions. Third, improvement of strength is achieved because the pedal member rigidity-securing distance is decreased, as compared with the related art. Thus, the disclosed pedal is very advantageous in terms of strength and rigidity. Strength and rigidity are improved by adding a separation wall rib using a cross-coupling member applied to the hinge portion of the pedal. Fourth, improved operability of the pedal is achieved because a pedal stroke by spherical contact is made that provides smooth operation of the pedal by applying a ball to the structure for separating the pedal at the hinge portion in a collision. Fifth, improvement of the commercial value of the pedal is achieved because the disclosed pedal satisfies oblique collision regulations that are severe collision conditions.

DETAILED DESCRIPTION

Hereinafter, embodiments of the present disclosure are described in detail with reference to the accompanying drawings. The present disclosure may be achieved in various alternate ways by those having ordinary skill in the art, so the present disclosure is not limited to the disclosed embodiments.

Figure 1:
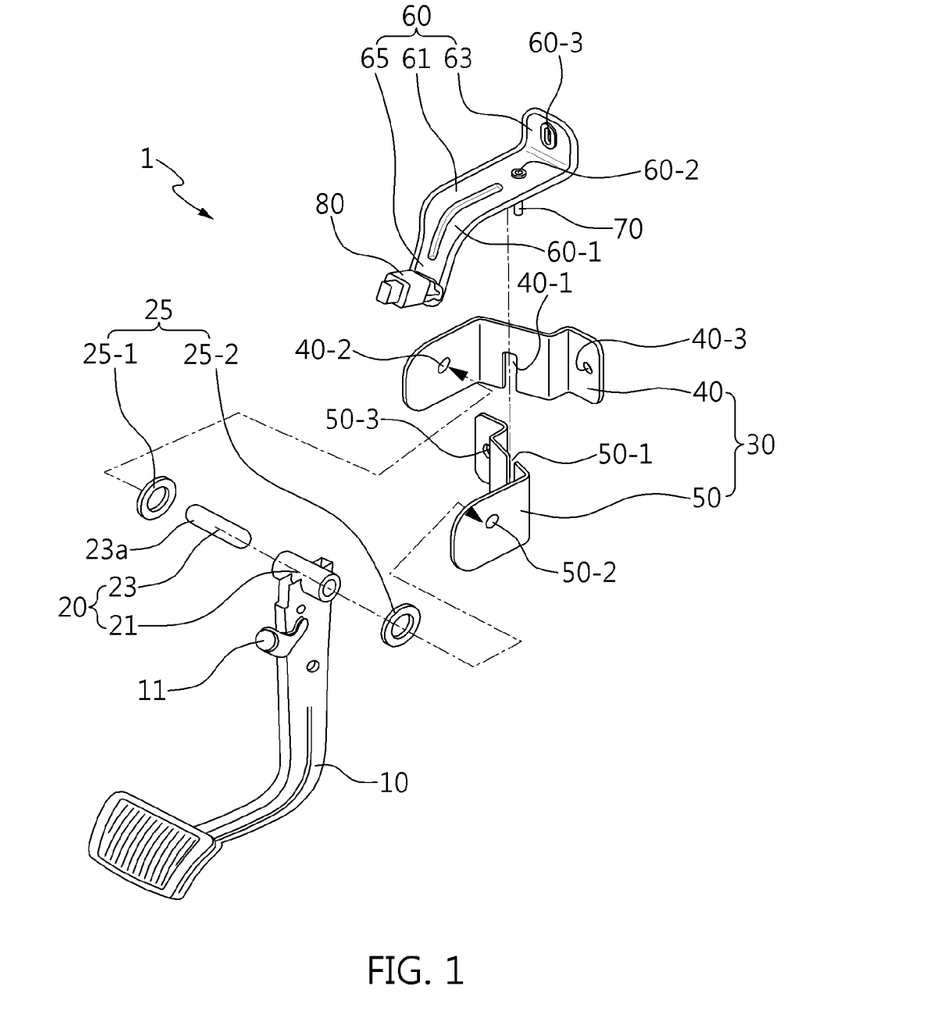
FIG. 1 is an exploded perspective view of an impact separation type pedal according to the present disclosure.

Referring to FIG. 1, a pedal 1 includes a pedal arm 10, a hinge 20, a pedal separator 30, a cover bracket 60, and a fixing pin 70. Further, the pedal 1 may include a kick-down switch 80.

The pedal arm 10 has a footing, i.e., a foot plate and pad at the lower portion and makes a pedal stroke about the hinge 20, which is coupled to the upper portion above the footing.

The hinge 20 is disposed through the upper portion above the footing of the pedal arm 10 and functions as a rotational center when the pedal arm 10 is pressed down by a driver. To this end, the hinge 20 is composed of a hinge pipe 21, a hinge pin 23, and a hinge bushing 25. For example, the hinge pipe 21, which is a hollow pipe, is fixed through the upper portion above the footing of the pedal arm 10. The hinge pin 23 has left and right ball, i.e., rounded ends and is disposed through the hinge pipe 21 with the left and right ball ends exposed out of or beyond the ends of the hinge pipe 21. The left and right ball ends 23a are coupled to left and right brackets 40 and 50 of the pedal separator 30. The hinge bushing 25 is composed of left and right circular ring-shaped hinge bushings 25-1 and 25-2 disposed at the left and right sides of the hinge pipe 21 and the left and right bushings are disposed between the left and right sides of the hinge pipe 21 and the left and right brackets 40 and 50.

Figure 8:
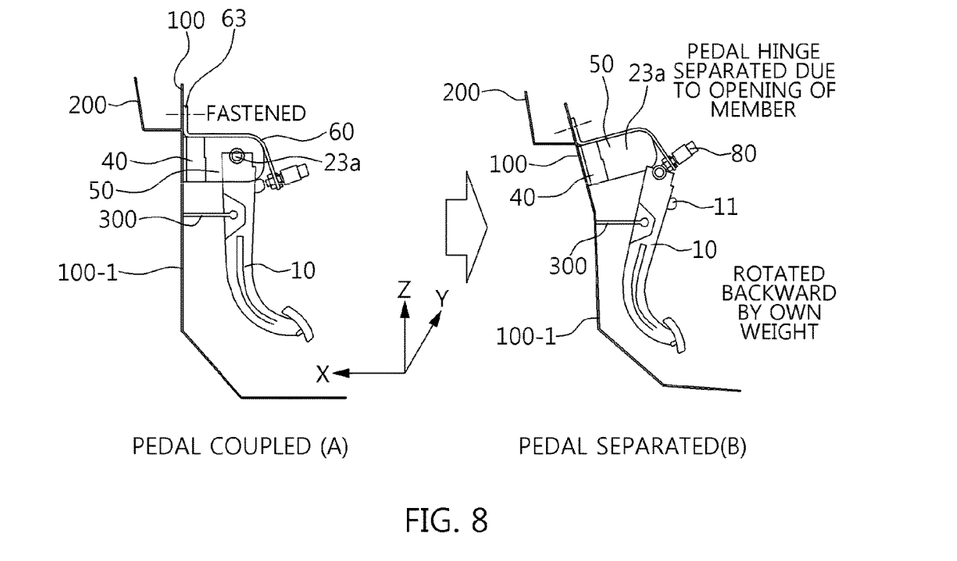
FIG. 8 is a view showing the operation after the impact separation type pedal is separated from a vehicle according to the present disclosure.

The pedal separator 30 is combined with the hinge 20 functioning as the rotational center of the pedal arm 10 when fastened to a vehicle body (dash panel 100 shown in FIG. 8). The pedal separator 30 is separated from the hinge 20 when the vehicle body is deformed, thereby preventing the pedal arm 10 from being pushed toward a driver due to deformation of the vehicle body. To this end, the pedal separator 30 is composed of the left bracket 40, which has a lower slit 40-1, a left projective groove 40-2, and a left fixing hole 40-3, and the right bracket 50, which has an upper slit 50-1, a right projective groove 50-2, and a right fixing hole 50-3. The upper and lower slits 40-1 and 50-1 connect the left and right brackets 40 and 50 in an X-shape. The left and right projective grooves 40-2 and 50-2 are formed in a semi-spherical shape and are coupled to the left and right ball ends 23a of the hinge pin 23 that are disposed through the left and right brackets 40 and 50. The left and right brackets 40 and 50 are fastened to the vehicle body (dash panel 100 shown in FIG. 8) by bolts or screws tightened through the left and right fixing holes 40-3 and 50-3.

The cover bracket 60 is disposed on the left and right brackets 40 and 50, which are connected in an X-shape. The cover bracket 60 is fixed to the left and right brackets 40 and 50 by welding and is coupled to the vehicle body (dash panel 100 shown in FIG. 8). To this end, the cover bracket 60 is composed of a cover body 61 having a pin hole 60-2 and having increasing rigidity by a rigid rib 60-1. The cover bracket 60 has a mounting cover or tab 63 bending upward from one end of the cover body 61. The mounting cover 63 has a mounting hole 60-3 to be fastened to the vehicle body by a bolt or a screw tightened through the mounting hole 60-3. The cover bracket 60 also has an extension body 65 bending downward from the other end of the cover body 61 and covering the upper portion of the pedal arm 10.

The fixing pin 70 is made of a material having a strength that is enough to be welded to the cover bracket 60 and fixes the cover bracket 60 and the left and right brackets 40 and 50. To this end, the fixing pin 70 is fitted in the pin hole 60-2 of the cover body 61 of the cover bracket 60 and is fixed to the X-shaped connection portion of the left and right brackets 40 and 50 by welding.

The kick-down switch 80 is coupled to the extension body 65 of the cover bracket 60. The kick-down switch 80 generates a kick-down signal when the pedal arm 10 is operated by cooperation with a kick-down lever 11 of the pedal arm 10.

Figure 2:
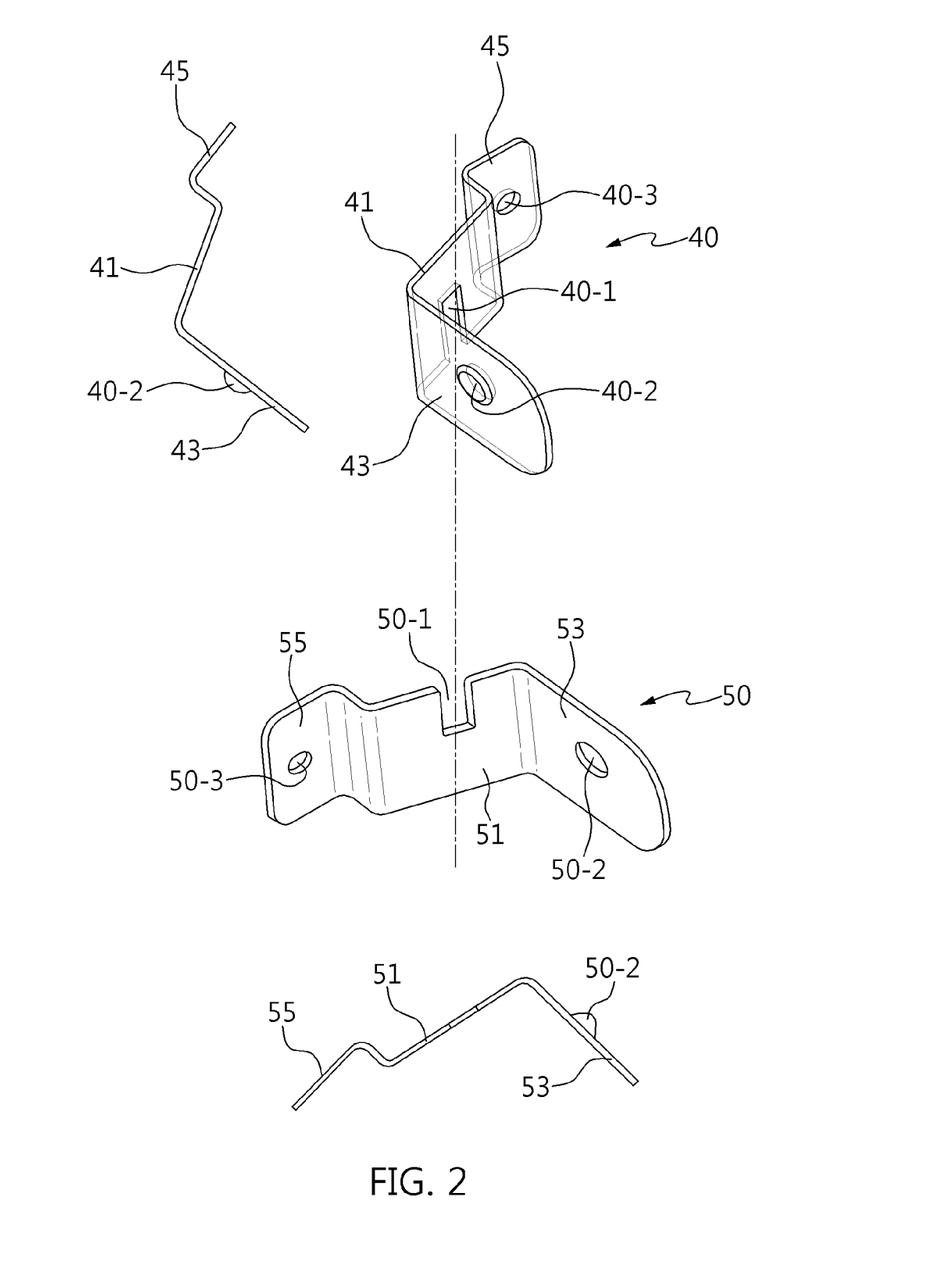
FIG. 2 is a view showing in detail a pedal separator according to the present disclosure.

Referring to FIG. 2, the detailed configuration of the left and right brackets 40 and 50 of the pedal separator 30 is shown.

The left bracket 40 is composed of a left cross body 41, which has the lower slit 40-1 formed lengthwise downward to a predetermined length. The left bracket 40 also has a left separation body 43, which has the left semispherical projective groove or projection 40-2 formed on a side by forming a semispherical groove or depression on the opposite side. The left bracket also has a left fixing body 45, which has the left fixing hole 40-3.

The right bracket 50 is composed of a right cross body 51, which has the upper slit 50-1 formed lengthwise upward to a predetermined length. The right bracket 50 also has a right separation body 53, which has the right semispherical projective groove or projection 50-2 formed on a side by forming a semispherical groove or depression on the opposite side. The right bracket also has a right fixing body 55, which has the right fixing hole 50-3.

Accordingly, the left and right brackets 40 and 50 have the same shape and structure in which the lower and upper slits 40-1 and 50-1, the left and right projective grooves 40-2 and 50-2, the left and right fixing holes 40-3 and 50-3, the left and right cross bodies 41 and 51, the left and right separation bodies 43 and 53, and the left and right fixing bodies 45 and 55 correspond to each other, respectively. Therefore, when the left and right brackets 40 and 50 are combined in an X-shape with the lower and upper slits 40-1 and 50-1 crossing or mating with each other, the left and right projective grooves 40-2 and 50-2 face each other with the X-shaped cross point (see FIG. 4).

Meanwhile, FIGS. 3-7 show the assembled state of the pedal 1.

Figure 3:
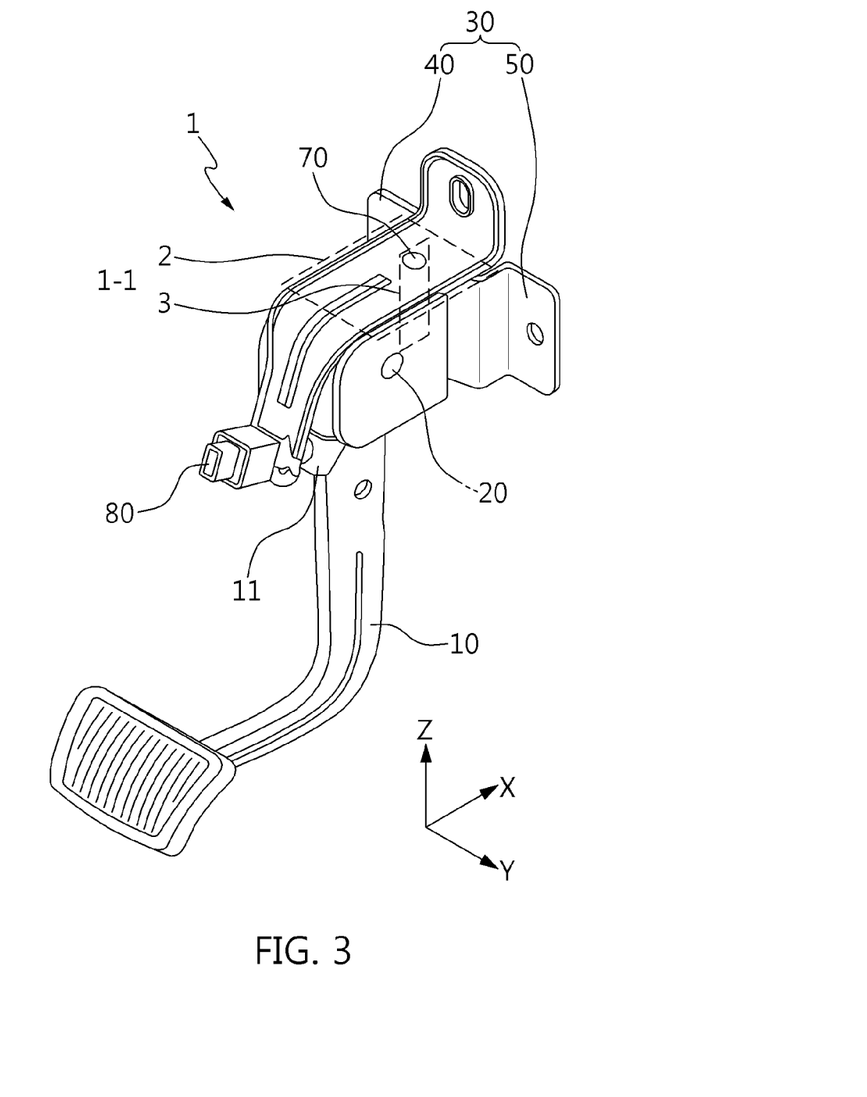
FIG. 3 is an assembly view of the impact separation type pedal according to the present disclosure.

Referring to the assembled state of the pedal 1 of FIG. 3, the pedal arm 10 is combined with the hinge 20 and coupled to a rigid body of the left and right brackets 40 and 50. The cover bracket 60 is fixed by the fixing pin 70 A pedal stroke is made about the hinge 20, which is supported by the X-shaped coupling structure of the left and right brackets 40 and 50. In this case, the kick-down switch 80 operating with the kick-down lever 11 of the pedal arm 10 is coupled to the cover bracket 60.

Further, the pedal 1 has a coupling portion 1-1 welded to the left and right brackets 40 and 50, the cover bracket 60, and the fixing pin 70, as shown in FIG. 3. The coupling portion 1-1 is divided into a horizontal coupling portion 2 and a vertical coupling portion 3.

Figure 4:
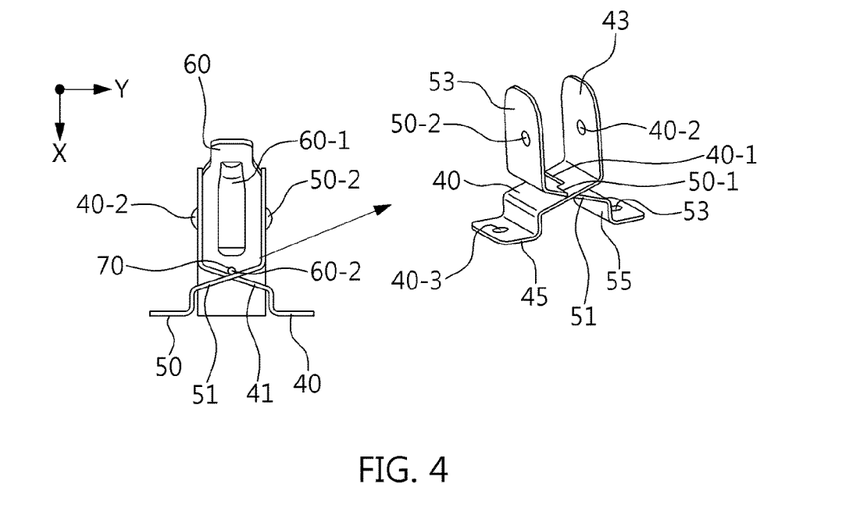
FIG. 4 is a view showing an assembled state of the pedal separator and a cover according to the present disclosure.

Referring to the coupling structure of the left and right brackets 40 and 50, the cover bracket 60, and the fixing pin 70 shown in FIG. 4, the left and right brackets 40 and 50 are fitted in the corresponding lower and upper slits 40-1 and 50-1, thereby forming the X-shaped combined state of the left and right cross bodies 41 and 51. Accordingly, the left and right separation bodies 43 and 53 of the left and right brackets 40 and 50 are arranged along the left and right sides of the cover bracket 60. The left and right projective grooves 40-2 and 50-2 are thus coupled to the left and right ball ends 23a of the hinge pin 23. Further, the left and right fixing holes 40-3 and 50-3 are disposed at the left and right sides of the cover bracket 60 and the left and right fixing bodies 45 and 55 of the left and right brackets 40 and 50 are fastened to the vehicle body (dash panel 100 shown in FIG. 8).

Figure 5:
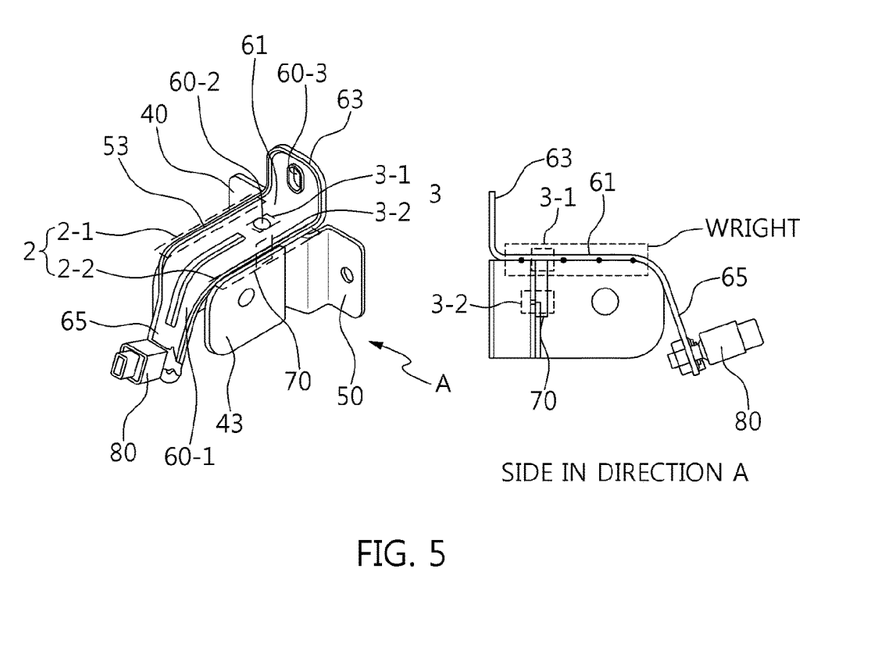
FIG. 5 is a view showing a welded state of the pedal separator and the cover according to the present disclosure.

Referring to the welding structure of the coupling portion 1-1 of FIG. 5, the coupling portion 1-1 is divided into the horizontal coupling portion 2 of left and right welding surfaces 2-1 and 2-2 and the vertical coupling portion 3 of upper and lower welding surfaces 3-1 and 3-2.

For example, the left fixing body 45 of the left bracket 40 and the right separation body 53 of the right bracket 50 are spot-welded through the left welding surface 2-1 on the left side of the cover bracket 60. Further, the right fixing body 55 of the right bracket 50 and the left separation body 43 of the left bracket 40 are spot-welded through the right welding surface 2-2 on the right side of the cover bracket 60. As a result, the left and right welding surfaces 2-1 and 2-2 allow the cover bracket 60 and the left and right brackets 40 and 50 to be fixed by spot welding.

For example, the upper welding surface 3-1 is spot-welded after being coupled to the cover body 61 by fitting the fixing pin 70 into the pin hole 60-2 of the cover bracket 60, thereby forming a fixing force for the cover bracket 60. Further, the lower welding surface 3-2 is spot-welded to the X-shaped portion formed by the left cross body 41 and the right cross body 51 of the right bracket 50, thereby forming a fixing force for the left and right brackets 40 and 50. As a result, the upper and lower welding surfaces 3-1 and 3-2 allow the cover bracket 60 and the left and right brackets 40 and 50 to be fixed by spot welding in cooperation with the fixing pin 70.

More specifically, spot welding of the left and right welding surfaces 2-1 and 2-2 and the upper and lower welding surfaces 3-1 and 3-2 resists a large static load, but can be easily separated in a short moment such as a collision or under large load. Thus, in a collision, the X-shaped portion of the left bracket 40 and the right bracket 50 is opened such that the hinge 20 can be easily separated.

Figure 6:
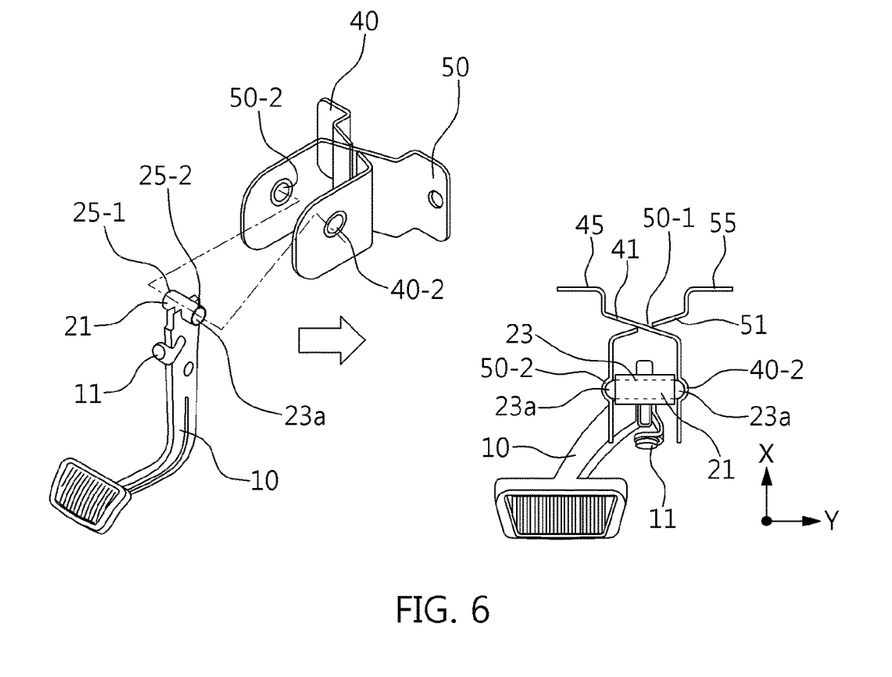
FIG. 6 is a view showing an assembled state of the pedal separator, a pedal arm, and a hinge according to the present disclosure.

Referring to the internal structure of the assembly of the pedal 1 shown in FIG. 6, the hinge pin 23 is coupled together with the hinge bushing 25 to the hinge pipe 21, which is welded to the pedal arm 10. The hinge pin 23 is coupled to the left and right brackets 40 and 50 by the ball ends 23a fitted in the left and right projective grooves 40-2 and 50-2 of the left and right separation bodies 43 and 53.

Accordingly, the pedal arm 10 can be smoothly pressed and operated because the contact area of a ball structure is increased in comparison to an existing linear contact. The semispherical structure of the ball ends 23a of the hinge pin 23 and the left and right projective grooves 40-2 and 50-2 of the left and right brackets 40 and 50 provides this improvement. The pedal arm 10, however, can be easily separated from the left and right brackets 40 and 50.

Figure 7:
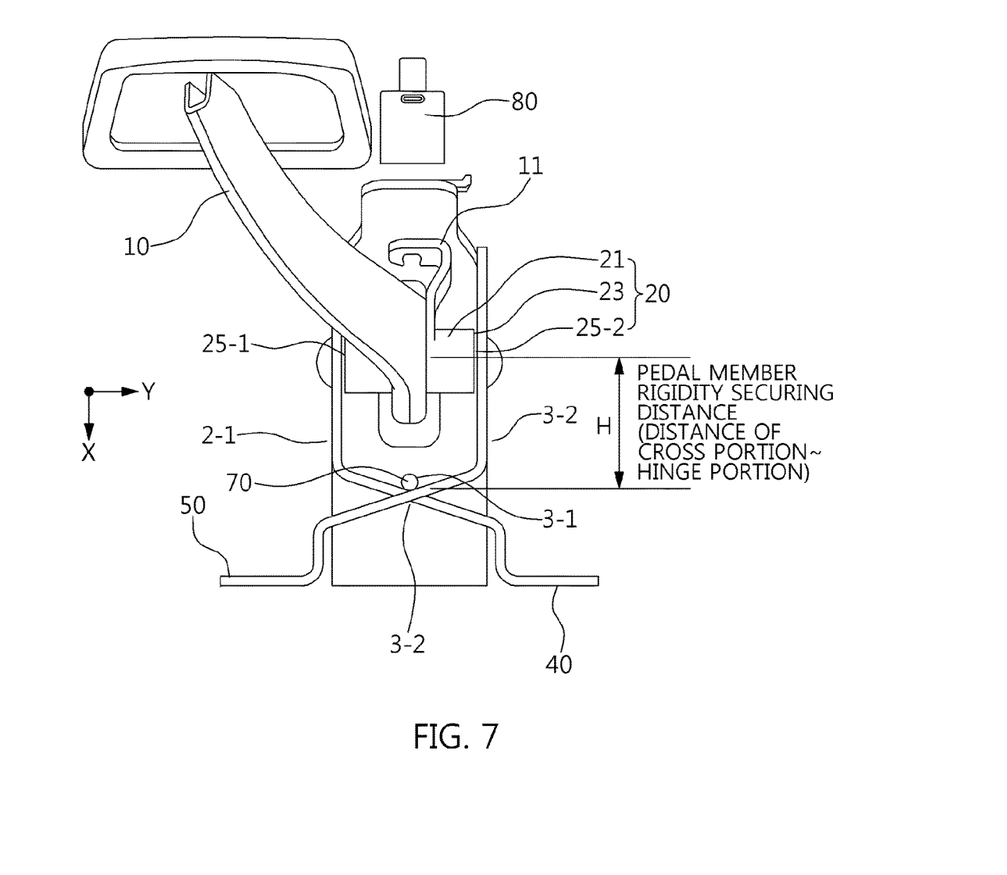
FIG. 7 is a bottom perspective view of the impact separation type pedal according to the present disclosure.

Referring to FIG. 7, in the layout of the pedal 10, a pedal member rigidity-securing distance H is secured by the distance between the hinge 20 and the fixing pin 70.

Accordingly, the pedal member rigidity-securing distance H is shorter than the distance from a vehicle body-fixed bracket of the related art. In addition, the left and right brackets 40 and 50 are combined in an X-shape, which remarkably increases the static strength of the pedal 1 combined with the pedal arm 10, thereby considerably improving strength and rigidity. For example, the pedal 1 can easily secure strength, which can be obtained by adding a separation wall rib to a vehicle body connection bracket member in an existing structure, due to the X-shaped structure of the left and right brackets 40 and 50 and reduction of the pedal member rigidity-securing distance H.

Meanwhile, FIG. 8 shows the pedal 1 in a mounted state on a vehicle.

Referring to a pedal-coupled state A of FIG. 8, the pedal 1 is coupled to a portion of the dash panel 100 positioned over a lower portion 100-1 of the dash panel connected to the bottom inside the vehicle. For example, the left and right brackets 40 and 50 are fastened to the dash panel 100 by bolts or screws through the left and right fixing holes 40-3 and 50-3 of the left and right fixing bodies 45 and 55. The cover bracket 60 is fastened through the mounting hole 60-3 of the mounting body 63 to the dash panel 100 to which a cowl panel 200 is connected. Further, in the pedal-coupled state A, the pedal arm 10 is connected with a booster rod 300 of a brake booster 300-1 (see FIG. 10) extending out of the dash panel 100. Therefore, when the pedal 1 is operated, the pedal arm 10 is pressed down through the hinge 20, thereby pushing the booster rod 300 in a pedal stroke.

In contrast, referring to a pedal-separate state B of FIG. 8, deformation of the dash panel 100, which is deformed more than the cowl panel 200 by an external shock, is transmitted to the left and right brackets 40 and 50 and the cover bracket 60 that are fixed to the dash panel 100. Further, the left and right brackets 40 and 50 and the cover bracket 60 are pushed up by deformation of the dash panel 100, and the left and right projective grooves 40-2 and 50-2 of the left and right brackets 40 and 50 are easily separated from the semispherical ball ends 23*a* of the hinge pin 23. As a result, the pedal arm 10, with the fixing force by the hinge pin 23 removed, is naturally rotated backward about the booster rod 300 by its own weight and is prevented from being pushed toward the driver, thereby preventing injury.

Figure 9:
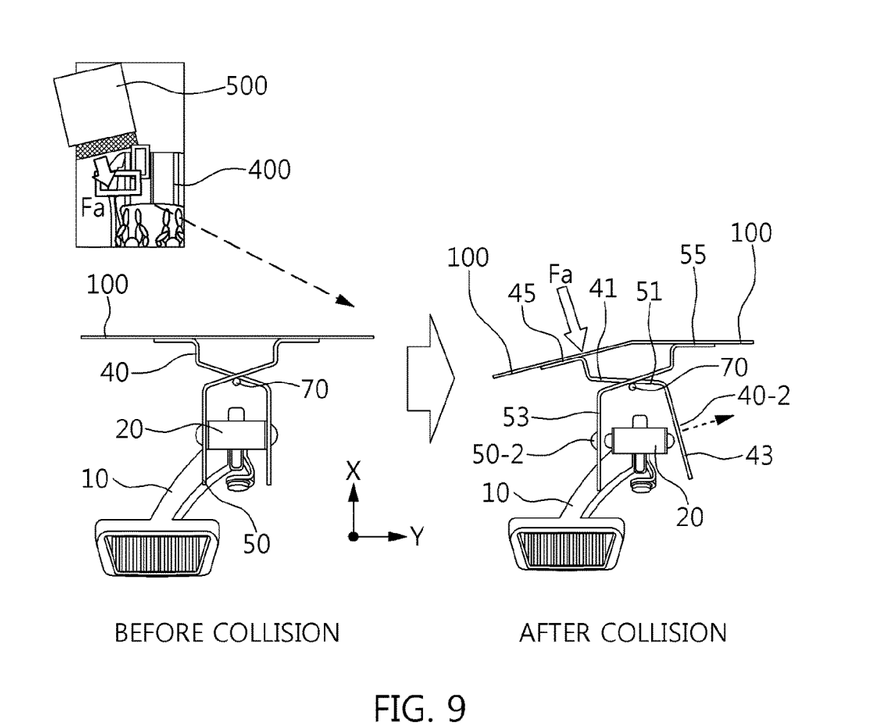
FIG. 9 is a view showing the pedal arm separator of the impact separation type pedal in an oblique collision state according to the present disclosure.
Figure 10:
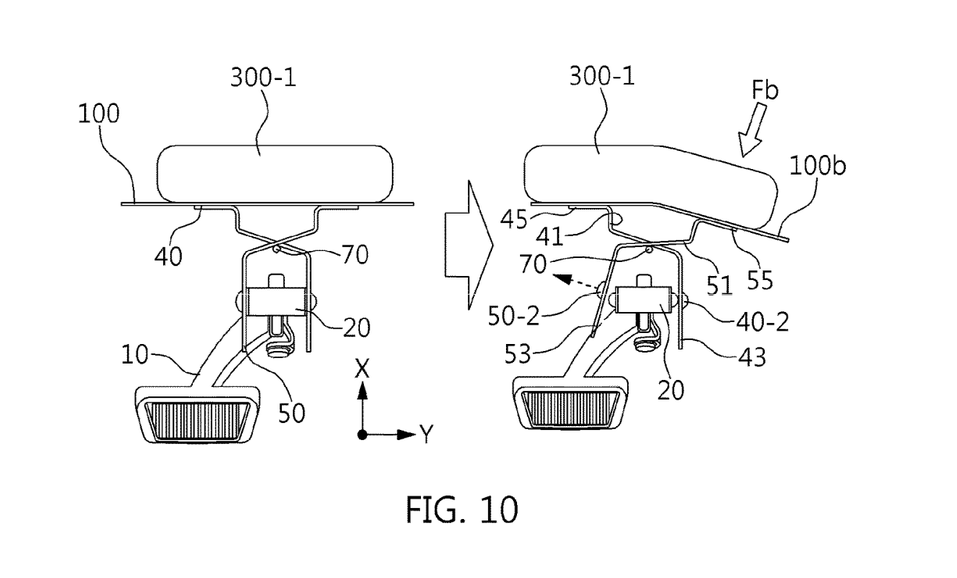
FIG. 10 is a view showing the pedal arm separator of the impact separation type pedal in an offset collision or a small overlap collision according to the present disclosure.
Figure 11:
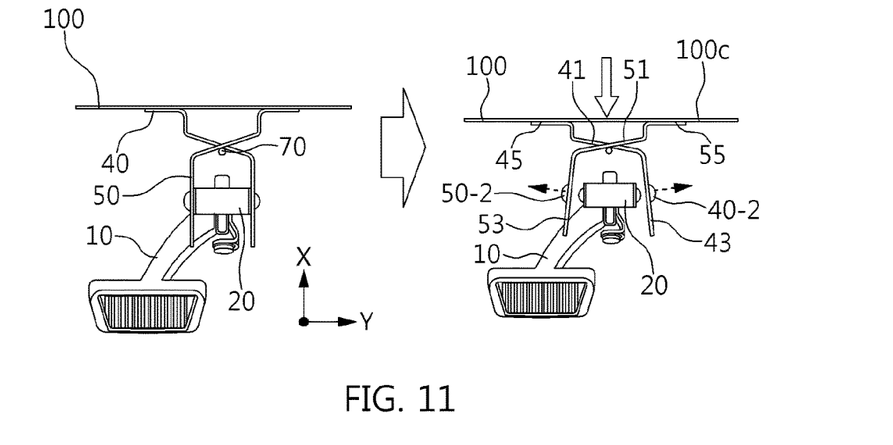
FIG. 11 is a view showing the pedal arm separator of the impact separation type pedal in a front collision according to the present disclosure.

Meanwhile, FIGS. 9-11 show the state in which the pedal is separated in front/offset/small overlap/oblique collisions between a vehicle 400 and a collision barrier 500. The front collision is defined as a collision test of the collision barrier 500 with the front of the vehicle. The offset collision is defined as a collision test of the collision barrier 500 on the front-side of the vehicle. The small overlap collision is defined as a collision test of the collision barrier 500 on the portion of the vehicle ahead of the driver's seat. The oblique collision is defined as a collision test of the collision barrier 500 diagonally on the vehicle.

Referring to the state of the pedal 1 in an oblique collision in FIG. 9, the dash panel 100, which holds the pedal 1 in a straight state before an oblique collision, is bent at the right portion by an oblique collision force Fa, thereby forming an oblique collision-deformed portion 100*a*. Further, the oblique collision force Fa pushes the left fixing body 45 of the left bracket 40 while forming the oblique collision-deformed portion 100*a*, whereby the left welding surface 2-1 formed by the cover bracket 60 and the left fixing body 45 of the left bracket 40 is broken.

Thereafter, the deformation of the left fixing body 45 due to the oblique collision force Fa is transmitted to the fixing pin 70. Accordingly, the fixing pin 70 prevents the pedal 1 from being pushed toward the driver. This is achieved through the upper and lower welding surfaces 3-1 and 3-2 fixing the left and right cross bodies 41 and 51 and the cover bracket 60. The fixing pin 70 functions as a rotational center that changes the pushed amount of the pedal 1 into a rotational amount. Accordingly, the right welding surface 2-2 formed by the cover bracket 60 and the left separation body 43 of the left bracket 40 is broken. Further, the left separation body 43 is deformed by rotating about the fixing pin 70 due to the breakage of the right welding surface 2-2. The collision energy of the oblique collision force Fa is thus converted into the rotational energy of the left bracket 40.

As described above, the oblique collision force Fa causes the oblique collision-deformed portion 100*a* on the dash panel 100. The oblique collision-deformed portion 100*a* causes partial pushed-deformation of the left fixing body 45 of the left bracket 40. The partial deformation of the left fixing body 45 causes rotational deformation of the left separation body 43 about the fixing pin 70. Accordingly, the hinge pin 23 is separated from the left projective groove 40-2 of the left separation body 43 and the fixing force by the hinge pin 23 is removed, so the pedal arm 1 is separated. Therefore, the pedal arm 10 is naturally rotated backward by its own weight about the booster rod 300 and is not pushed toward the driver, thereby preventing injury.

Referring to the state of the pedal 1 in an offset collision (or a small overlap collision), the dash panel 100, which holds the pedal 1 right before an offset collision (or a small overlap collision), is bent at the right portion by an offset collision force Fb applied through the booster 300-1, thereby forming an offset collision-deformed portion 100*b*. Further, the offset collision force Fb pushes the right fixing body 55 of the right bracket 50 while forming the offset collision-deformed portion 100*b*. Thus, the right welding surface 2-2 formed by the cover bracket 60 and the right fixing body 55 of the right bracket 50 is broken.

Thereafter, the deformation of the right fixing body 55 due to the offset collision force Fb is transmitted to the fixing pin 70. Accordingly, the fixing pin 70 prevents the pedal 1 from being pushed toward the driver through the upper and lower welding surfaces 3-1 and 3-2 fixing the left and right cross bodies 41 and 51 and the cover bracket 60. The fixing pin 70 also functions as a rotational center that changes the pushed amount of the pedal 1 into a rotational amount. Accordingly, the left welding surface 2-1 formed by the cover bracket 60 and the right separation body 53 of the right bracket 50 is broken. The right separation body 53 is also deformed by rotating about the fixing pin 70 due to the breakage of the left welding surface 2-1. Thus, the collision energy of the offset collision force Fb is converted into the rotational energy of the right bracket 50.

As described above, the offset collision force Fb causes the offset collision-deformed portion 100*b* on the dash panel 100. The offset collision-deformed portion 100*b* causes partial pushed-deformation of the right fixing body 55 of the right bracket 100. The partial deformation of the right fixing body 55 causes rotational deformation of the right separation body 53 about the fixing pin 70. Accordingly, the hinge pin 23 is separated from the right projective groove 50-2 of the right separation body 53 and the fixing force by the hinge pin 23 is removed, so the pedal arm 1 is separated. Therefore, the pedal arm 10 is naturally rotated backward by its own weight about the booster rod 300 and is not pushed toward the driver, thereby preventing injury.

Referring to the state of the pedal 1 in a front collision in FIG. 11, the dash panel 100, which holds the pedal 1 in a straight state before a front collision, is pushed inward by a front collision force Fc, thereby forming a front collision-deformed portion 100*c*. Further, when the front collision-deformed portion 100*c* is pushed by the front collision force Fc, the left and right fixing brackets 45 and 55 of the left and right brackets 40 and 50 are pushed and stopped by the fixing pin 70, which is fixed to the left and right cross bodies 41 and 51 and the cover bracket 60 through the upper and lower welding surfaces 3-1 and 3-2. As a result, the left and right fixing brackets 45 and 55 are compressed by the front collision force Fc, and the left and right cross bodies 41 and 51 generate a rotational force in the opposite direction about the fixing pin 70. This is because the cowl panel 200 that is a bending member of the vehicle body is large in rigidity, i.e., substantially rigid and far away from the lower portion of the vehicle, as compared with the dash panel 100, which is a flat plate. Thus, the dash panel 100 is further pushed than the cowl pane 200 in the front collision.

Thereafter, the rotational force of the left and right cross bodies 41 and 51 breaks the left and right welding surfaces 2-1 and 2-2, formed by the left and right separation bodies 43 and 53 of the left and right brackets 40 and 50. The left and right separation bodies 43 and 53 are rotated about the fixing pin 70 and deformed by the breakage of the left and right welding surfaces 2-1 and 2-2. Thus, the impact energy of the front collision force Fc is converted into rotational energy of the left and right brackets 40 and 50.

As described above, the front collision force Fb causes the front collision-deformed portion 100c on the dash panel 100. The front collision-deformed portion 100c causes partial pushed-deformation of the left and right fixing bodies 45 and 55 of the left and right brackets 40 and 50. The partial deformation of the left and right fixing bodies 45 and 55 causes rotational deformation of the left and right separation bodies 43 and 53 about the fixing pin 70. Accordingly, the hinge pin 23 is separated from the left and right projective grooves 50-1 and 50-2 of the left and right separation bodies 43 and 53 and the fixing force by the hinge pin 23 is removed, so the pedal arm 1 is separated. Therefore, the pedal arm 10 is naturally rotated backward by its own weight about the booster rod 300 and is not pushed toward the driver, thereby preventing injury.

As described above, the pedal 1 according to the disclosed embodiment includes the pair of brackets including the left bracket 40 and the right bracket 50 that are combined such that a portion is coupled to the hinge 20 of the pedal arm 10 and another portion is fixed to the vehicle body. The left and right brackets are fitted to each other in an X-shape. The cover bracket 60 is welded to the left and right brackets 40 and 50 over the X-shaped portion. The fixing pin 70 fixed is to the cover bracket 60 to be welded to the left and right brackets 40 and 50 at the X-shaped portion. The pedal arm 10 is separated due to deformation in an impact direction in an oblique collision as well as front/offset/small overlap collisions of a vehicle. The disclosed impact separation type pedal makes it is possible to prevent a driver from being injured by the pedal.

What is claimed is:

1. A pedal comprising:
    a left bracket and a right bracket combined such that a portion coupled to a hinge of a pedal arm and another portion fixed to a vehicle body are fitted to each other in an X-shape having an X-shaped portion;
    a cover bracket fixed to the left bracket and the right bracket over the X-shaped portion; and
    a fixing pin fixed to the cover bracket and fixed to the left bracket and the right bracket at a cross-point of the X-shaped portion wherein the left bracket has a slit, the right bracket has a slit, and the X-shape is formed by fitting the slits into each other.
2. The pedal of claim 1, wherein the fixing of the cover bracket and the fixing pin to the left and right bracket is spot welding.
3. The pedal of claim 1, wherein left and right sides of the cover bracket are fixed while covering a width of the left bracket and the right bracket when combined.
4. The pedal of claim 1, wherein the fixing pin performs the fixing by perpendicularly connecting the cover bracket and the cross point.
5. The pedal of claim 1, wherein the slit of the left bracket has a downward direction, and the slit of the right bracket has an upward direction.
6. The pedal of claim 5, wherein the left bracket includes a left separation body bending from a left cross body, which has the downward slit, toward the hinge and includes a left fixing body bending from the left cross body in a direction toward the vehicle body;
    the right bracket includes a right separation body bending from a right cross body, which has the upward slit, toward the hinge and includes a right fixing body bending from the right cross body in the direction toward the vehicle body; and
    the left separation body and the right separation body form a hinge coupling, and the left fixing body and the right fixing body form a vehicle body fixing.
7. The pedal of claim 6, wherein the hinge coupling is made by left and right ball ends of a hinge pin of the hinge, wherein the left and right ball ends are fitted in a left projective groove of the left separation body and a right projective groove of the right separation body, respectively, of the hinge pin of the hinge.
8. The pedal of claim 7, wherein the ball ends, the left projective groove, and the right projective groove are formed in a semispherical shape.
9. The pedal of claim 7, wherein the hinge pin is combined with a hinge pipe through which the ball ends are exposed at left and right ends of the hinge pipe, and wherein the hinge pipe is coupled to the pedal arm.
10. The pedal of claim 9, wherein left and right hinge bushings are coupled to the left and right exposed ball ends, respectively.
11. The pedal of claim 6, wherein the vehicle body fixing is secured to the vehicle body by bolts or screws.
12. The pedal of claim 1, wherein the cover bracket forms a vehicle body fixing portion.
13. The pedal of claim 12, wherein the vehicle body fixing portion is a mounting body formed by bending the cover bracket from the left bracket and a cover body fixed to the right bracket.
14. The pedal of claim 13, wherein the mounting body is fixed to the vehicle body by bolts or screws.
15. The pedal of claim 13, wherein an extension body bent from the cover body opposite to the mounting body is formed at the cover body and a kick-down switch is coupled to the extension body.
16. The pedal of claim 1, wherein the pedal arm secures a pedal member rigidity-securing distance from the distance between the X-shaped cross point and the hinge.

* * * * *